US011996986B2

(12) United States Patent
Bernardi et al.

(10) Patent No.: US 11,996,986 B2
(45) Date of Patent: May 28, 2024

(54) SYSTEMS AND METHODS FOR ZERO-FOOTPRINT LARGE-SCALE USER-ENTITY BEHAVIOR MODELING

(71) Applicant: Extreme Networks, Inc., San Jose, CA (US)

(72) Inventors: Giacomo Bernardi, London (GB); Markus Nispel, Boston, MA (US)

(73) Assignee: Extreme Networks, Inc., San Jose, CA (US)

(*) Notice: Subject to any disclaimer, the term of this patent is extended or adjusted under 35 U.S.C. 154(b) by 0 days.

(21) Appl. No.: 17/940,747

(22) Filed: Sep. 8, 2022

(65) Prior Publication Data

US 2023/0006892 A1 Jan. 5, 2023

Related U.S. Application Data

(62) Division of application No. 16/033,127, filed on Jul. 11, 2018, now Pat. No. 11,509,540.

(Continued)

(51) Int. Cl.
*H04L 41/14* (2022.01)
*G06F 40/205* (2020.01)
(Continued)

(52) U.S. Cl.
CPC .......... *H04L 41/145* (2013.01); *G06F 40/205* (2020.01); *G06N 3/08* (2013.01);
(Continued)

(58) Field of Classification Search
CPC ..... H04L 41/145; H04L 41/147; H04L 43/04; H04L 47/621; G06F 16/2255
See application file for complete search history.

(56) References Cited

U.S. PATENT DOCUMENTS 6,836,719 B2 12/2004 Andersson
8,032,937 B2* 10/2011 Ellis ...................... H04L 63/145
713/153

(Continued)

FOREIGN PATENT DOCUMENTS

EP 2884363 A2 6/2015

OTHER PUBLICATIONS

M. Mimura and H. Tanaka, "Long-Term Performance of a Generic Intrusion Detection Method Using Doc2vec," 2017 Fifth International Symposium on Computing and Networking (CANDAR), Aomori, Japan, 2017, pp. 456-462, doi: 10.1109/CANDAR.2017. 109. (Year: 2017).*

(Continued)

*Primary Examiner* — Dhairya A Patel
*Assistant Examiner* — Alex H. Tran
(74) *Attorney, Agent, or Firm* — Sterne, Kessler, Goldstein & Fox P.L.L.C.

(57) ABSTRACT

Systems and methods are disclosed herein for reducing storage space used in tracking behavior of a plurality of network endpoints by modeling the behavior with a behavior model. To this end, control circuitry may determine a respective network endpoint, of a plurality of network endpoints, to which each respective record of a plurality of received records corresponds. The control circuitry then may assign a dedicated queue for each respective network endpoint, and transmit, to each dedicated queue, each record that corresponds to the respective network endpoint to which the respective dedicated queue is assigned. The control circuitry may then determine, for each respective network endpoint, a respective behavior model, and may store each respective behavior model to memory.

21 Claims, 10 Drawing Sheets

Related U.S. Application Data

(60) Provisional application No. 62/598,632, filed on Dec. 14, 2017.

(51) Int. Cl.
  *G06N 3/08* (2023.01)
  *H04L 41/12* (2022.01)
  *H04L 41/147* (2022.01)
  *H04L 41/22* (2022.01)
  *H04L 43/04* (2022.01)
  *H04L 47/62* (2022.01)
  *G06F 16/22* (2019.01)

(52) U.S. Cl.
  CPC ............ *H04L 41/12* (2013.01); *H04L 41/147* (2013.01); *H04L 43/04* (2013.01); *H04L 47/621* (2013.01); *G06F 16/2255* (2019.01); *H04L 41/22* (2013.01)

(56) References Cited

U.S. PATENT DOCUMENTS

| | | | |
|---|---|---|---|
| 9,037,464 | B1 | 5/2015 | Mikolov et al. |
| 9,143,393 | B1 | 9/2015 | Bird |
| 9,185,125 | B2 | 11/2015 | Varsanyi et al. |
| 9,866,426 | B2 * | 1/2018 | Shelton ............... H04L 41/0631 |
| 9,998,485 | B2 | 6/2018 | Cohen et al. |
| 10,122,747 | B2 * | 11/2018 | Mahaffey ............ G06F 11/3006 |
| 10,148,540 | B2 * | 12/2018 | Boubez ................... H04L 43/04 |
| 10,235,372 | B1 | 3/2019 | Kesarwani |
| 10,423,624 | B2 | 9/2019 | Simhon et al. |
| 10,594,710 | B2 * | 3/2020 | Wright ................ H04L 63/1425 |
| 10,628,403 | B2 * | 4/2020 | Wu ......................... G06N 20/00 |
| 10,635,565 | B2 | 4/2020 | Dang |
| 10,740,309 | B2 * | 8/2020 | Nguyen .............. G06F 16/2264 |
| 10,776,400 | B2 * | 9/2020 | Malewicz ......... G06F 16/24545 |
| 10,972,437 | B2 * | 4/2021 | Schultz ............... H04L 63/0263 |
| 10,990,903 | B2 * | 4/2021 | Miranda ................ G06N 20/10 |
| 2004/0103211 | A1 | 5/2004 | Jackson |
| 2008/0243439 | A1 | 10/2008 | Runkle |
| 2009/0312985 | A1 | 12/2009 | Eliazar |
| 2010/0049676 | A1 | 2/2010 | Devitt |
| 2010/0082301 | A1 | 4/2010 | Skibiski |
| 2014/0058539 | A1 | 2/2014 | Park |
| 2014/0181825 | A1 | 6/2014 | He |
| 2014/0201838 | A1 | 7/2014 | Varsanyi et al. |
| 2015/0101053 | A1 | 4/2015 | Sipple |
| 2015/0195296 | A1 | 7/2015 | Vasseur |
| 2015/0341246 | A1 | 11/2015 | Boubez |
| 2016/0055042 | A1 | 2/2016 | Kwong et al. |
| 2016/0055044 | A1 | 2/2016 | Kawai |
| 2016/0239532 | A1 * | 8/2016 | Gould ................. G06F 16/2465 |
| 2016/0261465 | A1 | 9/2016 | Gupta |
| 2016/0359880 | A1 | 12/2016 | Pang |
| 2016/0366164 | A1 | 12/2016 | Cohen |
| 2017/0017537 | A1 | 1/2017 | Razin |
| 2017/0149813 | A1 | 5/2017 | Wright |
| 2017/0207997 | A1 | 7/2017 | Martin |
| 2017/0255708 | A1 * | 9/2017 | Cho ......................... G06F 16/22 |
| 2017/0279837 | A1 | 9/2017 | Dasgupta |
| 2017/0300532 | A1 | 10/2017 | Simhon |
| 2017/0339178 | A1 | 11/2017 | Mahaffey |
| 2018/0069880 | A1 | 3/2018 | Kupreev |
| 2018/0115574 | A1 | 4/2018 | Ridley |
| 2018/0198812 | A1 * | 7/2018 | Christodorescu ... H04L 63/1425 |
| 2018/0234302 | A1 * | 8/2018 | James .................... G06N 20/00 |
| 2018/0288198 | A1 | 10/2018 | Pope |
| 2019/0012456 | A1 | 1/2019 | Moore |
| 2019/0052516 | A1 | 2/2019 | Wright |
| 2019/0052659 | A1 | 2/2019 | Weingarten |
| 2019/0138420 | A1 | 5/2019 | Harutyunyan |
| 2019/0138616 | A1 | 5/2019 | Parameshwara |
| 2019/0163515 | A1 | 5/2019 | Sekhar Kakaraparthi |
| 2019/0190791 | A1 | 6/2019 | Bernardi et al. |

OTHER PUBLICATIONS

Bojanowski et al., "Enriching Word Vectors with Subword Information", arXiv:1607.04606v2 [cs.CL], Jun. 19, 2017, 12 pages.

Claise et al., "Information Model for IP Flow Information Export (IPFIX)", Internet Engineering Task Force (IETF), Request for Comments, 7012, Obsoletes: 5102, Category: Standards Track, ISSN: 2070-1721, Sep. 2013, 24 pages.

Claise et al., "Specification of the IP Flow Information Export (IPFIX) Protocol for the Exchange of Flow Information", Internet Engineering Task Force (IETF), Request for Comments, 7011, STD: 77, Obsoletes: 5101, Category: Standards Track, ISSN: 2070-1721, Sep. 2013, 76 pages.

C. S. Oehmen et al., "LINEBACKER: LINE-Speed Bio-Inspired Analysis and Characterization for Event Recognition," 2016 IEEE Security and Privacy Workshops (SPW), 2016, pp. 88-95, doi: 10.1109/SPW.2016.44. (Year: 2016).

D'Antonio et al., "Flow Selection Techniques", Internet Engineering Task Force (IETF), Request for Comments: 7014, Category: Standards Track, ISSN: 2070-1721, Sep. 2013, 33 pages.

He et al., "Experience Report: System Log Analysis for Anomaly Detection," 2016 IEEE 27th International Symposium on Software Reliability Engineering (ISSRE), Oct. 23, 2016; pp. 207-218.

International Search Report and Written Opinion of the International Searching Authority directed to related International Patent Application No. PCT/USIS/65207, dated Apr. 30, 2019, 15 pages.

Le et al., "Distributed Representations of Sentences and Documents", Proceedings of the 31st International Conference on Machine Learning, vol. 32, Beijing, China, Copyright 2014 by the authors, 9 pages.

Mamom Mimura and Hidema Tanaka, "Heavy Log Reader: Learning the Context of Cyber Attacks Automatically with Paragraph Vector," International Conference on Image Analysis and Processing, 17th International Conference (ICIAP), Dec. 2, 2017; pp. 146-163.

Mikolov et al., "Efficient Estimation of Word Representations in Vector Space", arXiv:1301.3781v3 [cs.CL], Sep. 7, 2013, 12 pages.

M. Mimura and H. Tanaka, "Long-Term Performance of a Generic Intrusion Detection Method Using Doc2vec," 2017 Fifth International Symposium on Computing and Networking (CANDAR), 2017, pp. 456-462, doi: 10.1109/CANDAR.2017.109. (Year: 2017).

Supplementary European Search Report directed to related European Patent Application No. 18887653.6, dated Jul. 23, 2021; 10 pages.

Trammell et al., Bidirectional Flow Export Using IP Flow Information Export (IPFIX), Network Working Group, Request for Comments: 5103, Category: Standards Track, Jan. 2008, 24 paqes.

Trammell et al., "Flow Aggregation for the IP Flow Information Export (IPFIX) Protocol", Internet Engineering Task Force (IETF), Request for Comments, 7015, Category: Standards Track, ISSN: 2070-1721, Sep. 2013, 49 pages.

Trammell et al., "Guidelines for Authors and Reviewers of IP Flow Information Export (IPFIX) Information Elements", Internet Engineering Task Force (IETF), Request for Comments, 7013, BCP: 184, Category: Best Current Practice, ISSN: 2070-1721, Sep. 2013, 32 pages.

\* cited by examiner

SYSTEMS AND METHODS FOR ZERO-FOOTPRINT LARGE-SCALE USER-ENTITY BEHAVIOR MODELING

CROSS REFERENCE TO RELATED APPLICATIONS

This application is a divisional of U.S. application Ser. No. 16/033,127, filed Jul. 11, 2018, which claims the benefit of U.S. Provisional Application No. 62/598,632, filed Dec. 14, 2017, the disclosures of which are hereby incorporated by reference herein in their entireties.

BACKGROUND

Traditionally, using a central server to monitor network behavior of many network end point devices requires storing myriad records of network flows for analysis. For example, existing systems require storage of Netflow and Internet Protocol Flow Information Export ("IPFIX") records, Hypertext Transfer Protocol ("HTTP") proxy logs, and the like, in a "big data" backend for subsequent processing. This involves great expense, as storing these records requires use of large amounts of storage space, amounting to many terabytes, and real estate to house the storage space (i.e., the "big data" facilities) is similarly expensive. This problem is exacerbated by the proliferation of gadgets and other devices becoming network-connected (e.g., Internet-of-Things devices), which multiplies the amount of network endpoints to be monitored, making it impractical to store network flows for all network devices for the purpose of behavior monitoring.

SUMMARY

Systems and methods are disclosed herein for monitoring behavior of network endpoints without a need for a "big data" storage backend. Specifically, the systems and methods disclosed herein reduce the records of network flows to vectors, thus enabling the system to save behavior models of millions of network endpoints, or more, using only a small amount of storage (e.g., a few gigabytes of storage).

In some aspects of the disclosure, control circuitry receives a plurality of records, each respective record of the plurality of records corresponding to a respective network endpoint of the plurality of network endpoints. Each respective record may identify a respective single network flow originating from the respective network endpoint that corresponds to the respective record. The control circuitry may determine a respective network endpoint, of a plurality of network endpoints, to which each respective record of the plurality of records corresponds.

The control circuitry may assign a respective dedicated queue for each respective network endpoint. For example, the control circuitry may dedicate a single first-in-first-out ("FIFO") queue for all records originating from a given network endpoint. The control circuitry may then transmit, to each respective dedicated queue, each record of the plurality of records that corresponds to the respective network endpoint to which the respective dedicated queue is assigned.

The control circuitry may determine, for each respective network endpoint, based on each record of each respective dedicated queue corresponding to each respective network endpoint, a respective behavior model, and may store each respective behavior model to memory. In some embodiments, the control circuitry, when determining the respective behavior model, may identify a plurality of modules programmed to determine behavior models, and may identify a module of the plurality of modules that is idle. The control circuitry may command the idle module to determine the respective behavior model. The module may be a software instantiation of an algorithm for determining a behavior model based on the records of a given queue.

In some embodiments, the control circuitry, when determining the respective behavior model, encodes data of the set of respective records as a multi-dimensional vector of floating point values. The control circuitry may determine whether a given multi-dimensional vector represents abnormal behavior for a given respective network endpoint. In response to determining that the given multi-dimensional vector represents abnormal behavior for the given respective network endpoint, the control circuitry may alert a network administrator or perform a set of predefined actions.

The control circuitry, when encoding the data of each respective record within the respective dedicated queues, may extract respective data from a respective field of each respective single network flow, concatenate the respective data into a string, and convert the string into a vector. Each respective data point may form a point in the vector. The control circuitry may use the vector as the respective behavior model.

The control circuitry, when converting the string into the vector, may form a document with the string. The control circuitry may then feed the document into a word/document embedding algorithm (e.g., Document to Vector ("doc2vec"), FastText, and the like), and, using the doc2vec algorithm, may analyze the document using a shallow neural network. The control circuitry may then output, based on the analyzing, the vector.

In some embodiments, the plurality of records is of a first data size, where a sum of a data size of each respective behavior model is of a second data size, and where the second data size is two or more orders of magnitude smaller than the first data size. For example, while the plurality of records may amount to hundreds of terabytes of data, the vectors, taken together, that represent the records, may amount to a few gigabytes of data.

In some embodiments, the control circuitry may receive a command from a network administrator to view a respective behavior model for a given network endpoint. In response to receiving the command, the control circuitry may generate for display a graphical representation of the respective behavior model for the given network endpoint. Furthermore, the control circuitry may determine a different network endpoint that has a respective behavior model showing similar behavior to behavior of the given network endpoint, and may generate for simultaneous display with the graphical representation of the respective behavior model for the given network endpoint, the respective behavior model for the different network endpoint.

In some aspects, systems and methods are enclosed for reducing storage space used in tracking behavior of a plurality of network endpoints by using a hash table and modeling the behavior with a behavior model. Control circuitry may receive a plurality of records, each respective record of the plurality of records corresponding to a respective network endpoint of the plurality of network endpoints. Control circuitry may determine the respective network endpoint, of a plurality of network endpoints, to which each respective record of the plurality of records corresponds, and may encode each respective record into respective words.

In some embodiments, the control circuitry assigns, for each respective record, a respective block to a respective hash table, and adds, to respective linked list records for each respective block, the respective words corresponding to each network endpoint corresponding to each respective block. The control circuitry determines, for each respective network endpoint, based on each respective linked list for each respective block, a respective behavior model, and stores each respective behavior model to memory.

The control circuitry, when assigning, for each respective record, a respective block to a respective hash table, may monitor the plurality of records for a record corresponding to an unknown network endpoint. In response to detecting, from the monitoring, an unknown network endpoint, the control circuitry may add a block corresponding to the unknown network endpoint to the hash table.

In some embodiments, the control circuitry may determine, for each respective network endpoint, based on each respective linked list for each respective block, a respective behavior model in response to detecting a threshold amount of words have accumulated for a given respective network endpoint. In some embodiments, the control circuitry, when determining for each respective network endpoint, based on each respective linked list for each respective block, a respective behavior model, may feed the hash table through a word/document embedding algorithm (such as the FastText algorithm).

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
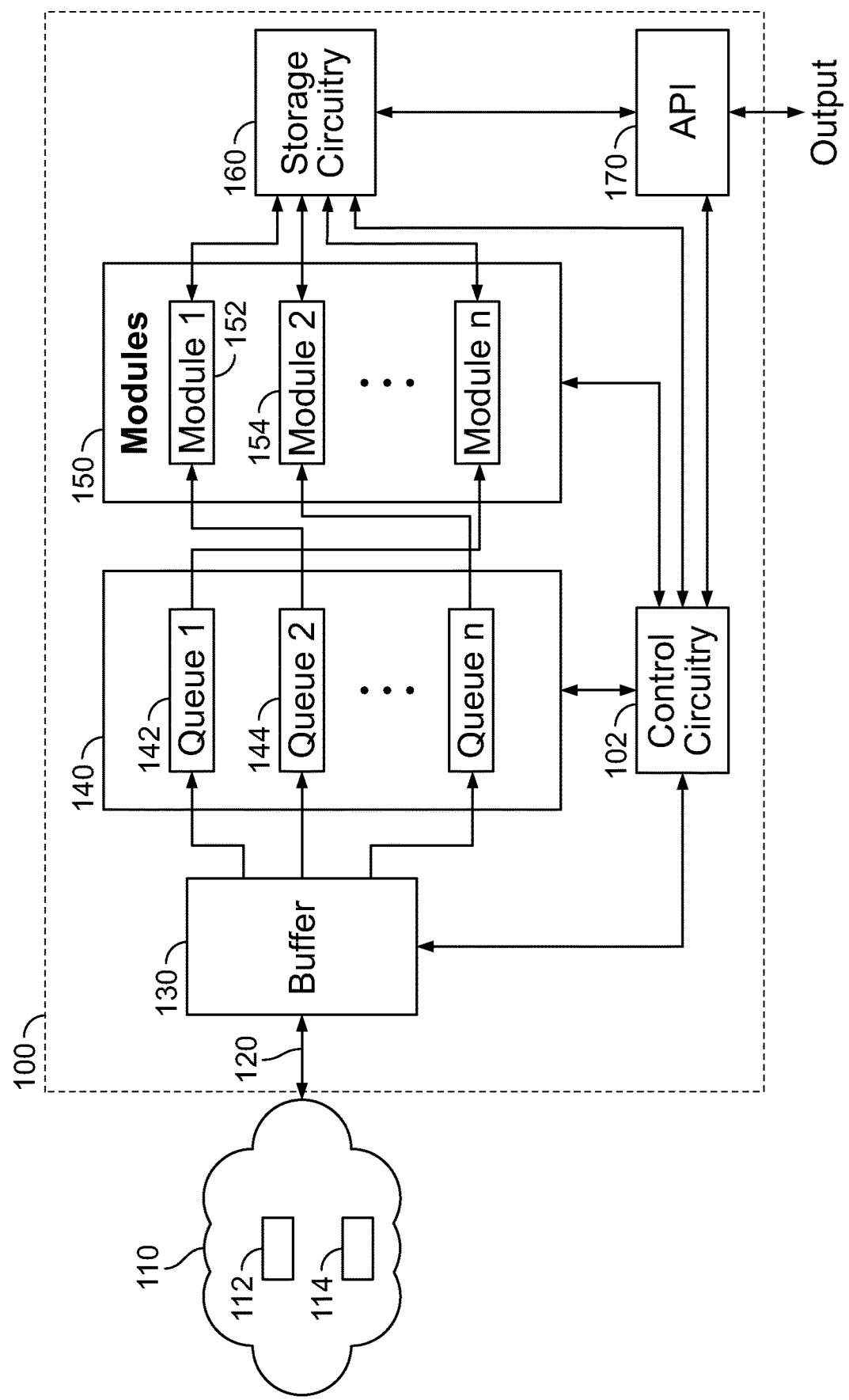
FIG. 1 depicts a system for reducing storage space used in tracking behavior of a plurality of network endpoints by modeling the behavior with a behavior model, in accordance with some embodiments of the disclosure.

FIG. 1 depicts a system for reducing storage space used in tracking behavior of a plurality of network endpoints by modeling the behavior with a behavior model, in accordance with some embodiments of the disclosure. As depicted in FIG. 1, server 100 is used to model behavior of network endpoints of network 110, such as network endpoint 112 and network endpoint 114. While server 100 is depicted as one server including several components, this is merely for convenience; the components of server 100 may be distributed across multiple servers and databases. As used herein, a network endpoint may be any end device, such as a consumer electronics device (e.g., smartphone, personal computer, etc.), an Internet-of-Things device, or any other user-facing device that is connected to network 110.

Control circuitry 102 of server 100 receives records from network endpoints of network 110 (e.g., network device 112 and network device 114) by way of communications circuitry 120. Communications circuitry 120 may be any known receiver, transmitter, transceiver, or any other known means of transmitting and/or receiving data. As used herein, the term "record" may refer to logs of network activities. Examples of records are Netflow records, IPFIX records, HTTP proxy logs, and the like. In some embodiments, each record identifies a single network flow. In some embodiments, control circuitry 102 may augment the records to include extra metadata, such as an application identifier, HTTP/HTTPs (HTTP Secure) header values, Transport Layer Security ("TLS") certificate details, and the like. Control circuitry 102 may augment the records through a fingerprinting process, and/or can perform this augmentation by ingesting bidirectional IPFIX records.

The records may be received at buffer 130. Control circuitry 102 may determine to which network endpoint each record corresponds. For example, control circuitry 102 may differentiate records that correspond to network endpoint 112 from records that correspond to network endpoint 114. Control circuitry 102 may then designate a different queue for each network endpoint, such that records corresponding to each different network endpoint are transmitted from buffer 130 to a designated queue of queues 140. As depicted in FIG. 1, records corresponding to network endpoint 112 may be transmitted to queue 142, and records corresponding to network endpoint 114 may be transmitted to queue 144. Control circuitry 102 may instantiate as many queues n as is necessary to use a dedicated queue for each network endpoint for which records are received. In some embodiments, queues 140 are FIFO queues. In other embodiments, queues 140 may be any form of queue.

In some embodiments, control circuitry 102 schedules processing of the records in queues 140, where processing is performed by modules 150. Modules 150 are not dedicated to a given queue. As an example, queue 144 may be assigned to module 152 for processing, as depicted in FIG. 1. When any of modules 154 completes processing of the records from a given queue, the modules 154 revert to an idle state.

In some embodiments, control circuitry 102 identifies idle modules, and commands each idle module to process records from a specific queue. In selecting to which queue of queues 150 an idle module should be assigned, control circuitry may determine which queues are overflowing in size by determining which queues have a number of records that exceed a threshold. In some embodiments, the threshold is configured by a network administrator. In some embodiments, the threshold is a default value. Control circuitry 102 may prioritize queues that have a number of records that exceed the threshold by assigning idle modules to those queues first. Control circuitry may assign remaining idle modules based on any known load balancing scheme (e.g., based on which queues have the most records), or arbitrarily.

In some embodiments, modules 150 generate a behavior model as a result of processing the records of a given queue of queues 140. A given module (e.g., module 154) may generate the behavior model by encoding data of the records into a multi-dimensional vector. In some embodiments, in order to encode the data, control circuitry 102 instructs a module of module 150 (e.g., module 152) to extract data from a subset of fields of records of a given queue (e.g., queue 144). Control circuitry 102 instructs the module (e.g., module 152) to generate a string from the extracted data (the string is also referred to as a "flow word" herein). Control circuitry 202 may then concatenate the "flow words" derived from the queue to form a document.

Figure 2:
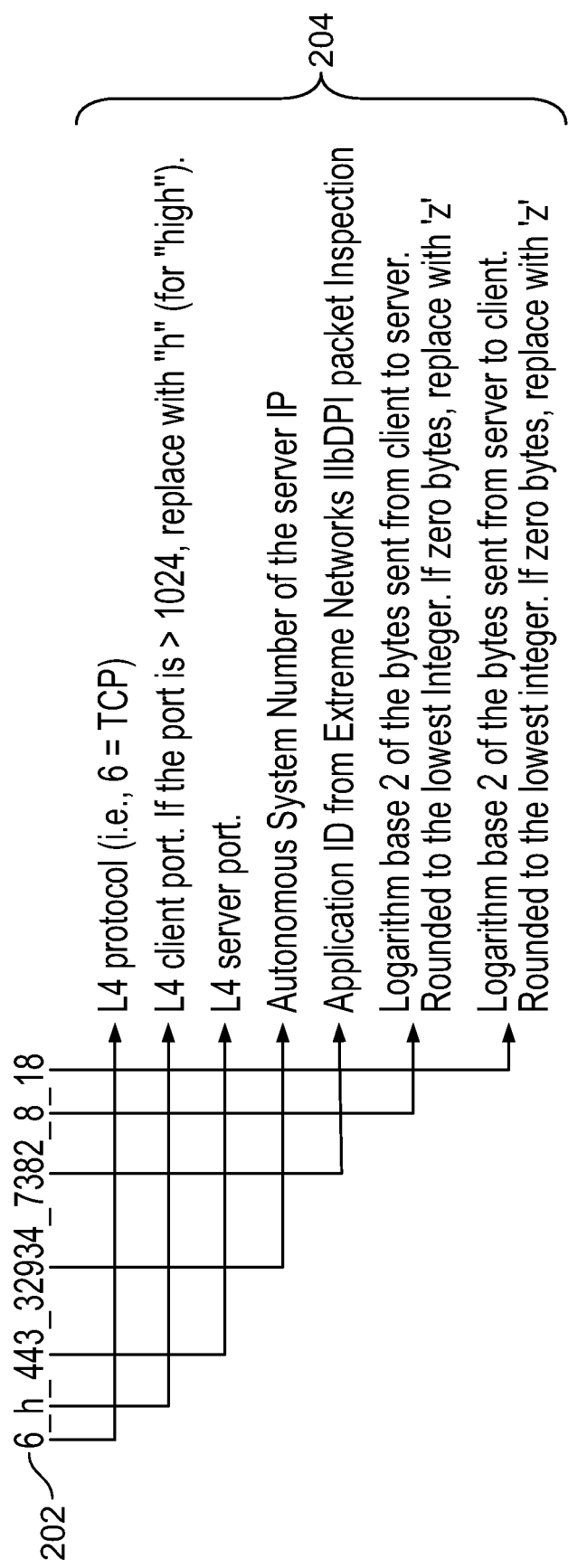
FIG. 2 depicts an example document, comprising flow words corresponding to a given network endpoint, in accordance with some embodiments of the disclosure.

FIG. 2 depicts an example document, comprising flow words corresponding to a given network endpoint, in accordance with some embodiments of the disclosure. The aforementioned flow words are each separated by a space, or underscore, in document 202. Each flow word has known meanings mapped in storage at server 100 (e.g., at storage circuitry 160). Exemplary meanings 204 are described in reference to each flow word of document 202, and are self-explanatory. The flow words fields shown in FIG. 2 are merely illustrative; any set of applicable fields may be used.

After forming a document, control circuitry 102 feeds the document into a doc2vec algorithm. Doc2vec algorithms are described in detail in a publication entitled "Distributed Representations of Sentences and Documents", authored by Le and Mikolov, and published in 2014, the disclosure of which is hereby incorporated by reference herein in its entity. Doc2vec is based on the word2vec algorithm, which is described in a publication entitled "Efficient Estimation of Word Representations in Vector Space," authored by Mikolov, Chen, Corrado, and Dean, and published in 2013, the disclosure of which is hereby incorporated by reference herein in its entity. Word2vec is further described in U.S. Pat. No. 9,037,464, issued on May 19, 2015, the disclosure of which is hereby incorporated by reference herein in its entirety.

In brief, when control circuitry 102 feeds the document into the doc2vec algorithm, control circuitry 102 uses a shallow neural network to generate a vector encoding for each word that appears in a given document, and for the document itself. As described in the aforementioned publications that describe doc2vec and word2vec algorithms, in one embodiment of the disclosure, control circuitry 102 implements a "Paragraph Vector—Distributed Bag of Words" formulation of the doc2vec algorithm. This entails control circuitry 102 implementing a sliding window (e.g., of a configurable or default size) iterating over the document by selecting a subset of words of the document. Control circuitry 102 then applies a stochastic gradient descent to compute weights and biases that best fit the shallow neural network in predicting a target identifier for the endpoint. Control circuitry 102 then averages the set of weights for each word to compose a vector that represents the network endpoint to which the document corresponds. The endpoint vector may be represented as an array of floating point values. In some embodiments, the vector is formed of three-hundred to five-hundred floating point values.

Control circuitry 102 causes each vector to be stored to memory, by storage circuitry 160. Moreover, as described above, because the vectors are limited in size, behavior modeling is possible without use of a "big data" facility. There are additional advantages to avoiding storing the records themselves. Namely, these records often include sensitive private information about users (e.g., personally-identifying information, financial information, and the like). Thus, if these records are inappropriately accessed (e.g., through a hacking or malware operation), legal and privacy issues may arise. The storage of a vector, as disclosed herein, rather than storing the records themselves, avoids these risks by avoiding storing such sensitive information, while still maintaining the ability to monitor the behavior of the network endpoint.

Storage circuitry 160 may be any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc. Control circuitry 102 may be based on any suitable processing circuitry, such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 102 executes instructions stored in memory (i.e., storage circuitry 160).

Following storage of an endpoint vector, control circuitry 102 may receive a request from a network administrator to view a given endpoint vector. Control circuitry 102 may respond to such a request by using Application Program Interface ("API") 170 to output a visual depiction of a behavior model.

In some embodiments, control circuitry 102 may track behavior of the network endpoint over time. For example, by performing a word/document embedding computation (e.g., Doc2Vec or FastText) for a given network endpoint periodically over time, control circuitry 102 may identify recurring patterns of the endpoint. Differences in network behavior would be indicated by a movement of a resulting vector from subsequent computations to a different position in multidimensional space. Control circuitry 102 may implement Kalman filters to track the point position over time, or derive a multivariate Gaussian distribution to determine the probability of the point corresponding to the network endpoint's behavior being in a given position of the multidimensional space, or use a recursive neural network to learn behavior change over time. Control circuitry 102 may determine, if the point is located in a region of low probability value, that the network endpoint is engaged in anomalous behavior, and may alert a network administrator of the anomaly.

Figure 3:
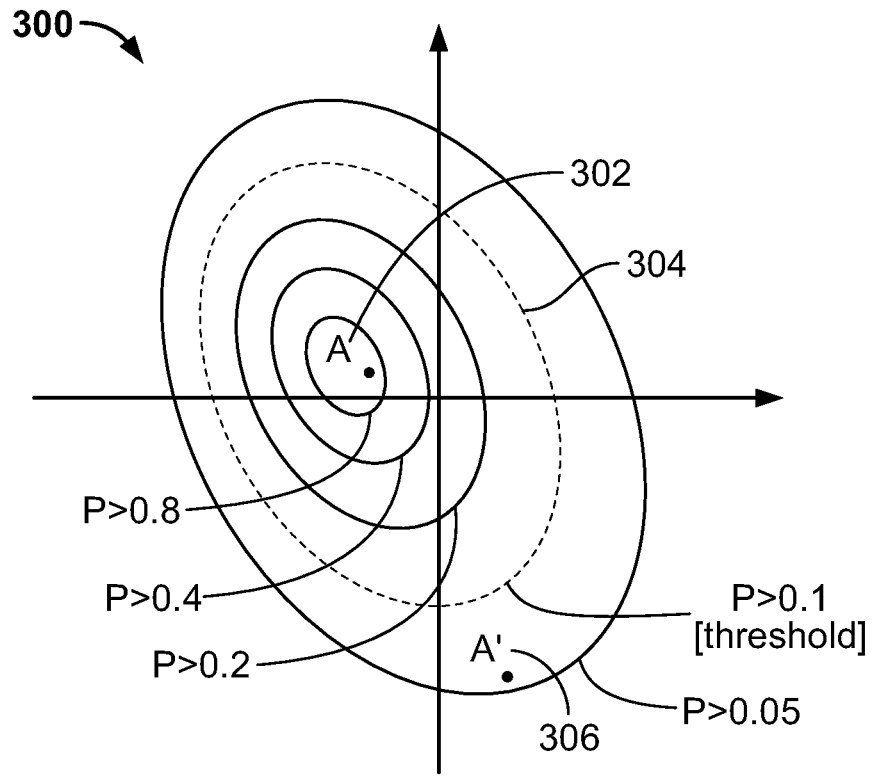
FIG. 3 depicts an illustrative two-dimensional projection of a higher-dimensionality vector space, in accordance with some embodiments of the disclosure.

FIG. 3 depicts an illustrative two-dimensional projection of a higher-dimensionality vector space, in accordance with some embodiments of the disclosure. The concentric ovals depicted in vector space 300 each correspond to a different probability value of where a network administrator would expect a given network endpoint to be. Point 302, marked with the character "A", illustrates a location that control circuitry 102 would deem to be a normal behavior for the endpoint. If, however, control circuitry 102 determines that the location described by the endpoint vector moves to point 306, marked with "A'", control circuitry 102 may alert a network administrator of anomalous behavior. Control circuitry 102 may determine to issue the alert based on point 306 being outside of the boundaries of normalcy threshold 304, which may be configured by a network administrator, or may be a default value.

Figure 4:
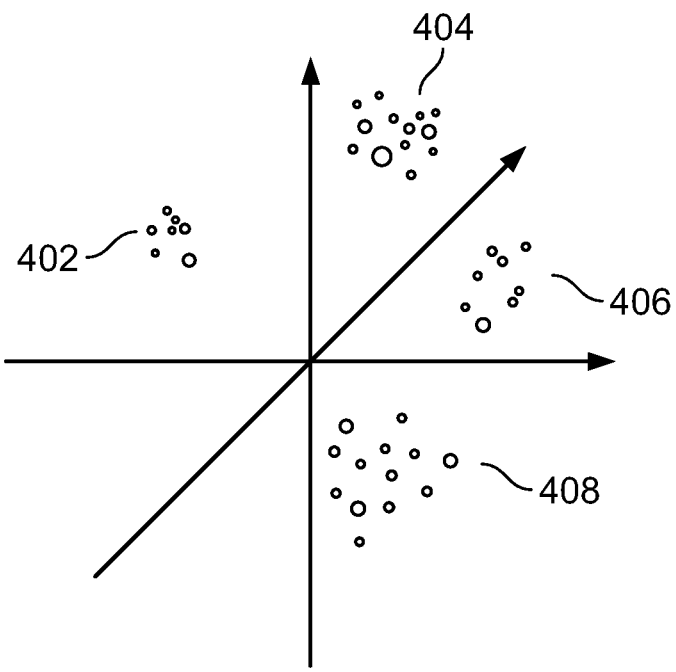
FIG. 4 is an illustrative depiction of a projection on 3D space of multiple endpoint vectors, in accordance with some embodiments of the disclosure.

FIG. 4 is an illustrative depiction of a projection on 3D space of multiple endpoint vectors, in accordance with some embodiments of the disclosure. In some embodiments, a network administrator may request to view a typical behavior of endpoints in large and heterogeneous networks, in order to identify clusters of endpoints with similar behavior and to quantify their population. Control circuitry 102, receiving such a request, may use API 170 to output a visualization of such a 3D space, e.g., by depicting cluster 402, cluster 404, cluster 406, and cluster 408. Each of these clusters are depicted closely to one another due to their having similar network behaviors.

Figure 5:
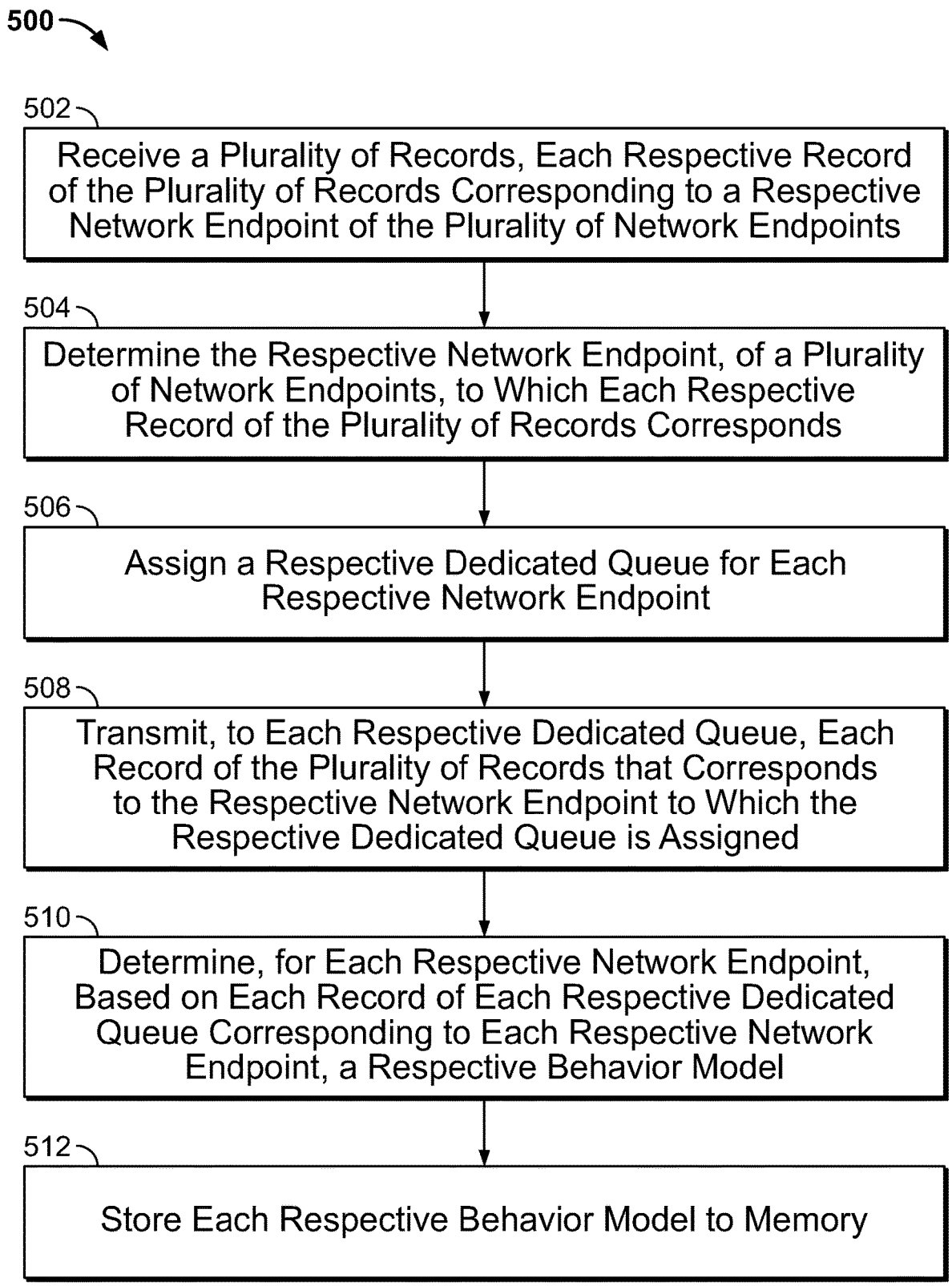
FIG. 5 depicts an illustrative flowchart of a process for reducing storage space used in tracking behavior of a plurality of network endpoints by modeling the behavior with a behavior model, in accordance with some embodiments of the disclosure.

FIG. 5 depicts an illustrative flowchart of a process for reducing storage space used in tracking behavior of a plurality of network endpoints by modeling the behavior with a behavior model, in accordance with some embodiments of the disclosure. Process 500 begins at 502, where control circuitry (e.g., control circuitry 102 of server 100) receives a plurality of records, each respective record of the plurality of records corresponding to a respective network endpoint of the plurality of network endpoints.

Process 500 continues to 504, where control circuitry 102 determines the respective network endpoint, of a plurality of network endpoints (e.g., network endpoint 112 and network endpoint 114 of network 110), to which each respective record of the plurality of records corresponds. At 506, control circuitry 102 assigns a respective dedicated queue for each respective network endpoint (e.g., queue 142 and queue 144 of queues 140).

At 508, control circuitry 102 transmits, to each respective dedicated queue, each record of the plurality of records that corresponds to the respective network endpoint to which the respective dedicated queue is assigned. At 510, control circuitry 102 determines, for each respective network endpoint, based on each record of each respective dedicated queue corresponding to each respective network endpoint, a respective behavior model. Control circuitry 102 may perform this determination using any of modules 150. At 512, control circuitry 102 stores each respective behavior model to memory (e.g., using storage circuitry 160).

Figure 6:
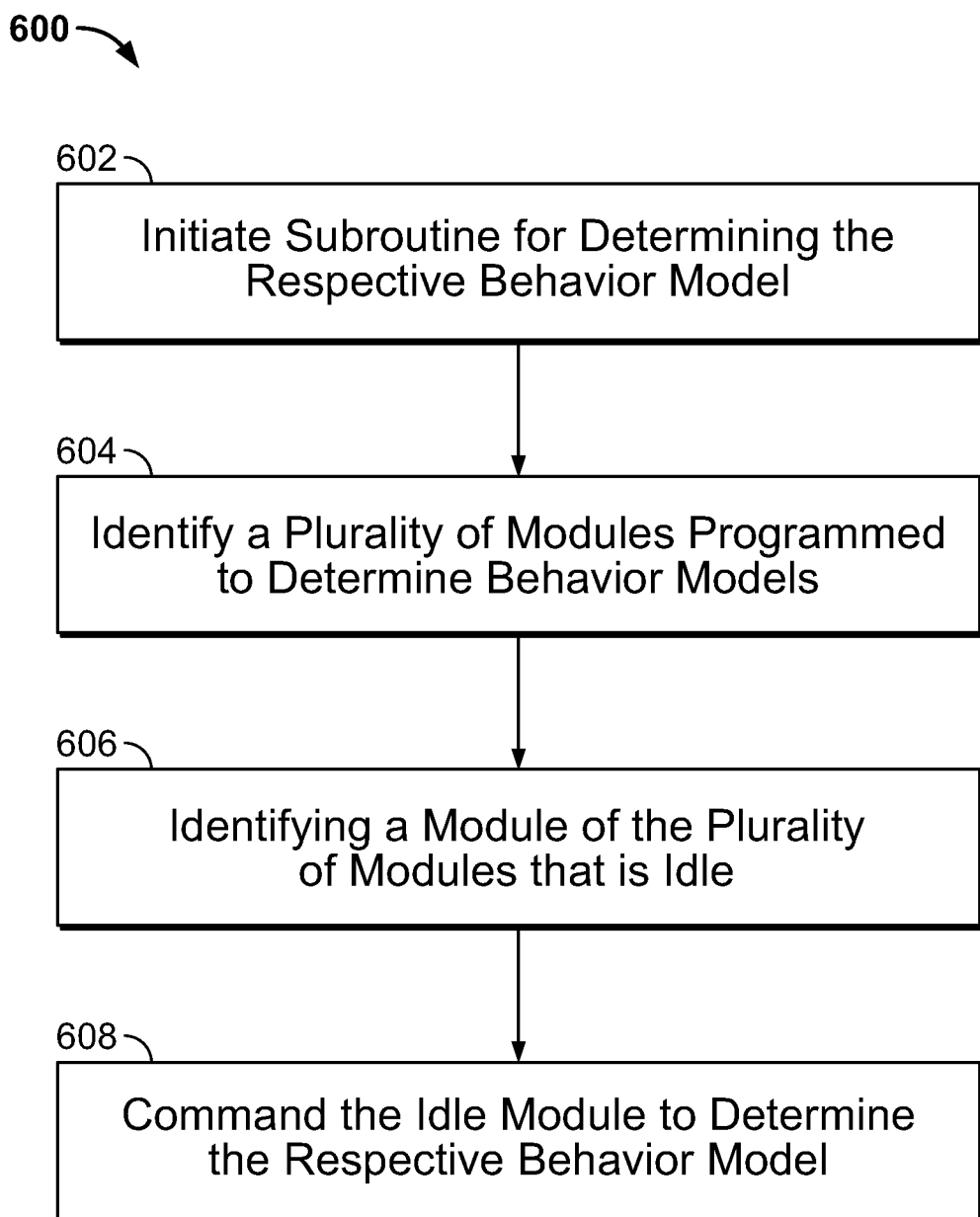
FIG. 6 depicts an illustrative flowchart for a process for determining a respective behavior module, in accordance with some embodiments of the disclosure.

FIG. 6 depicts an illustrative flowchart for a process for determining a respective behavior module, in accordance with some embodiments of the disclosure. Process 600 begins at 602, where control circuitry 102 initiates a subroutine for determining the respective behavior model (e.g., a subroutine for effecting 510 of FIG. 5). At 604, control circuitry 102 identifies a plurality of modules programmed to determine behavior models (e.g., modules 150). At 606, control circuitry 102 identifies a module of the plurality of modules that is idle, and at 608, control circuitry 102 commands the idle module to determine the respective behavior model.

Figure 7:
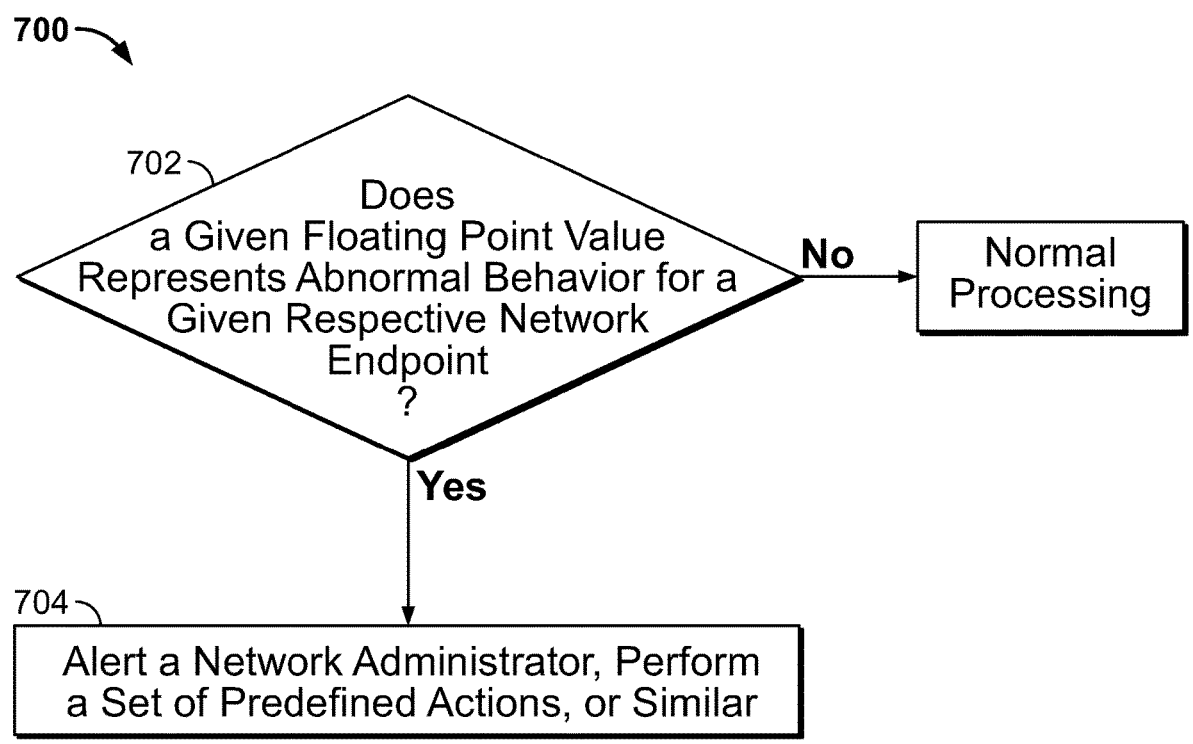
FIG. 7 depicts an illustrative flowchart for a process for alerting a network administrator of anomalous network endpoint behavior, in accordance with some embodiments of the disclosure.

FIG. 7 depicts an illustrative flowchart for a process for alerting a network administrator of anomalous network endpoint behavior, in accordance with some embodiments of the disclosure. Process 700 begins at 702, where control circuitry 102 determines whether a given floating point value represents abnormal behavior for a given respective network endpoint (e.g., network endpoint 112). If the determination is in the negative, control circuitry 102 determines that the network endpoint is behaving normally. If the determination is in the affirmative, process 700 proceeds to 704, where control circuitry 102 alerts a network administrator (e.g., using API 170), performs a set of predefined actions, or similar.

Figure 8:
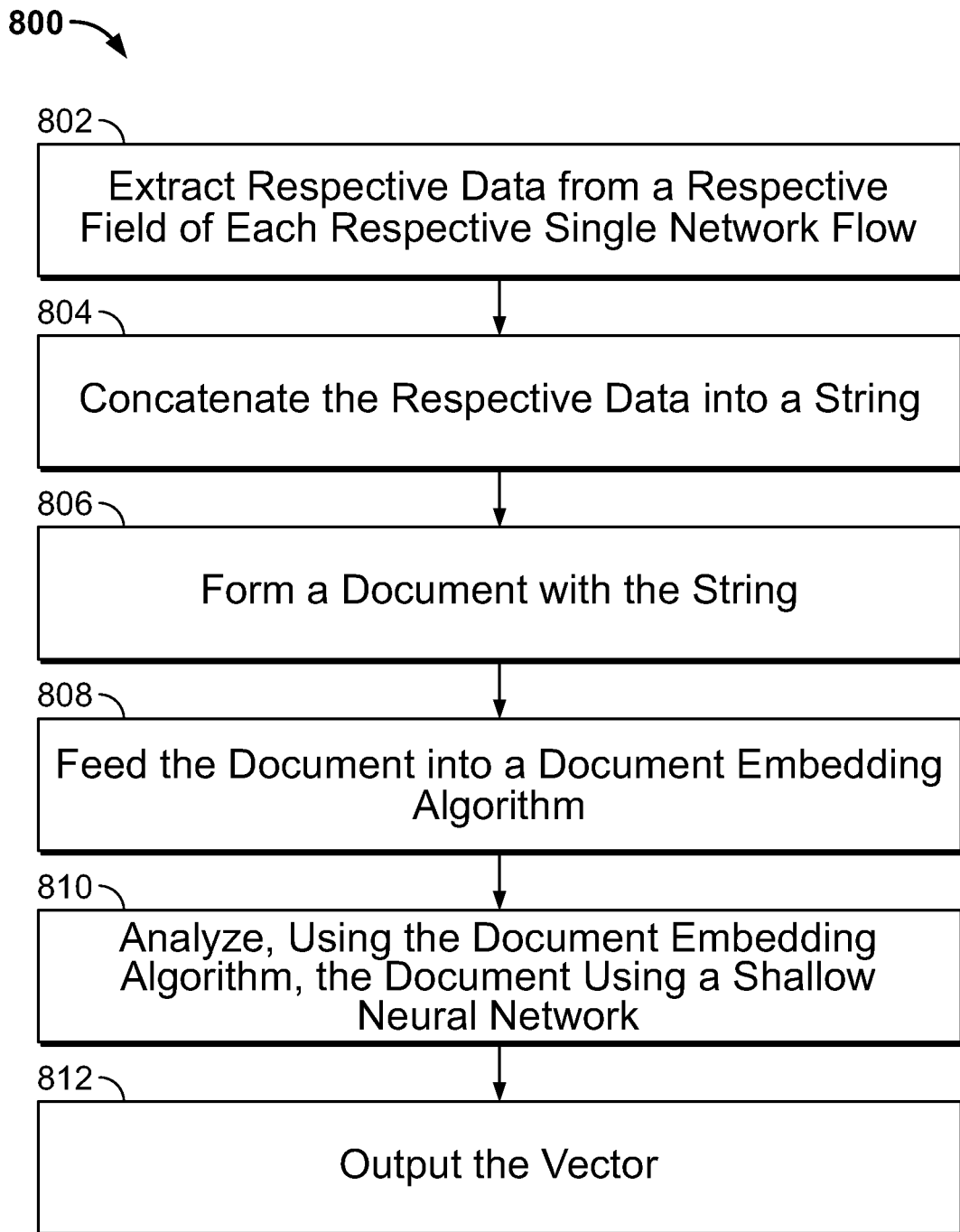
FIG. 8 depicts an illustrative flowchart of a process for generating a vector that models endpoint device behavior using a word/document embedding algorithm, in accordance with some embodiments of the disclosure.

FIG. 8 depicts an illustrative flowchart of a process for generating a vector that models endpoint device behavior using a word/document embedding algorithm (e.g., doc2vec), in accordance with some embodiments of the disclosure. Process 800 begins at 802, where control circuitry 102 extracts respective data from a respective field of each respective single network flow. At 804, control circuitry 102 concatenates the respective data into a string. At 806, control circuitry 102 forms a document with the string (e.g., document 202). At 808, control circuitry 102 feeds the document into a word/document embedding algorithm (e.g., doc2vec or FastText). At 810, control circuitry 102 analyzes, using the word/document embedding algorithm, the document using a shallow neural network. At 812, control circuitry 102 outputs the vector (e.g., to storage 160, or to API 170 for a visual representation to be generated).

Figure 9:
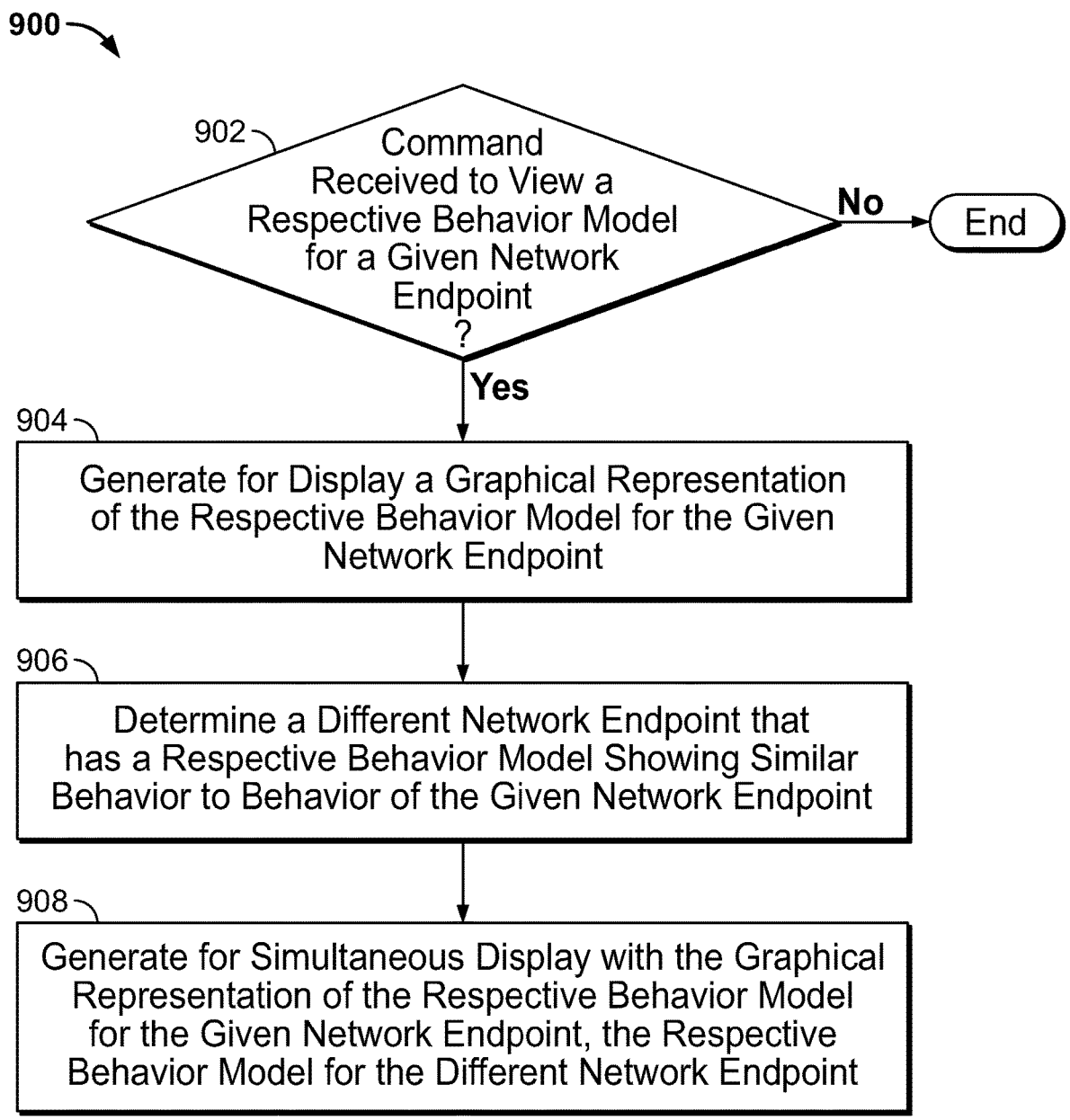
FIG. 9 depicts an illustrative flowchart of a process for generating for display a visual representation of a behavior model, in accordance with some embodiments of the disclosure.

FIG. 9 depicts an illustrative flowchart of a process for generating for display a visual representation of a behavior model, in accordance with some embodiments of the disclosure. Process 900 begins at 902, where control circuitry 102 determines whether a command is received to view a respective behavior model for a given network endpoint. If the determination is in the negative, process 900 ends. If the determination is in the affirmative, process 900 continues to 904, where control circuitry 102 generates for display a graphical representation of the respective behavior model for the given network endpoint (e.g., the representation depicted in FIG. 3). At 906, control circuitry 102 determines a different network endpoint that has a respective behavior model showing similar behavior to behavior of the given network endpoint. At 908, control circuitry 102 generates for simultaneous display with the graphical representation of the respective behavior model for the given network endpoint, the respective behavior model for the different network endpoint (e.g., the representation depicted in FIG. 4).

Figure 10:
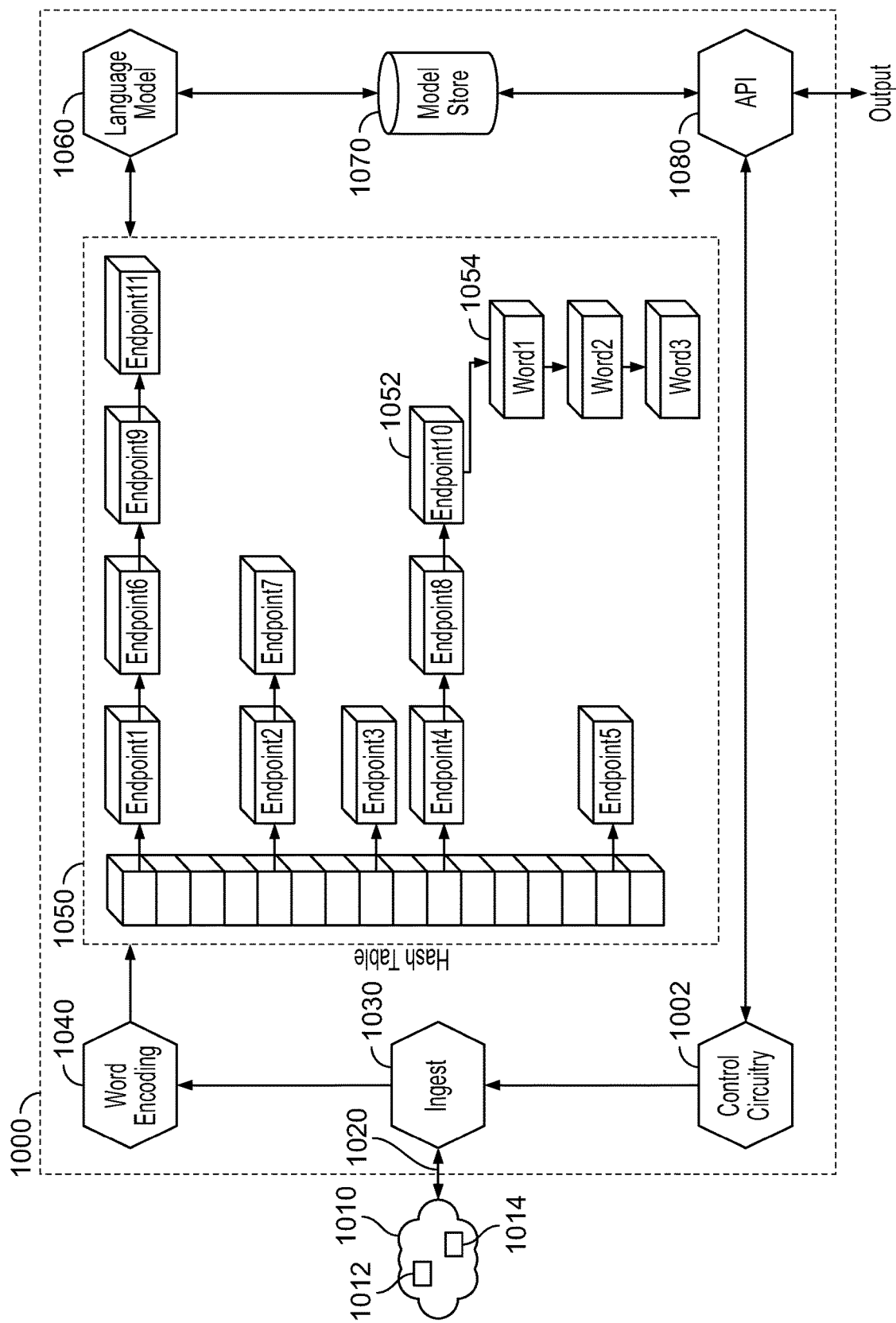
FIG. 10 depicts a system for reducing storage space used in tracking behavior of a plurality of network endpoints by modeling the behavior with a behavior model using a hash table, in accordance with some embodiments of the disclosure.

FIG. 10 depicts a system for reducing storage space used in tracking behavior of a plurality of network endpoints by modeling the behavior with a behavior model using a hash table, in accordance with some embodiments of the disclosure. FIG. 10 includes server 1000, which acts in the manner in which server 100 acts, as described above. Server 1000 receives records from network endpoints of network 1014 (e.g., network endpoint 1012 and network endpoint 1014). Network 1014 acts in the manner in which network 110 acts, as described above. Network endpoint 1012 and network endpoint 1014 act in the manner in which network endpoint 112 and network endpoint 1014 act, as described above. Server 1000 receives the records using communications circuitry 1020, which acts in the manner communications circuitry 120 acts, as described above.

Ingest module 1030 receives the records from network 1010, and operates in accordance with the manners described above. For example, the operations of control circuitry 102 in connection with buffer 130 described above are equivalent to the manner in which control circuitry 1002 interacts with ingest module 1030. Records ingested by ingest module 1030 are forwarded to word encoding module 1040. Word encoding module 1040 encodes records to words in accordance with the manners described in the foregoing. For example, word encoding will result in flow words being generated, such as the flow words depicted in FIG. 2.

After encoding the records from the network endpoints to words, control circuitry 1002 modifies hash table 1050 to include records corresponding to each network endpoint. For example, control circuitry 1002 may determine whether a network endpoint (e.g., endpoint10 corresponding to endpoint 1014 in network 1010) already has an entry on the hash table. If control circuitry 1002 determines that there is no entry for endpoint10 on hash table 1050, control circuitry 1002 adds a block to hash table 1050 for endpoint10, such as block 1052. Control circuitry 1002 associates, for each network endpoint, words encoded by word encoding module 1040 into a linked list (e.g., linked list 1054) corresponding to a given network endpoint.

After hash table 1050 is populated, control circuitry 1002 may feed hash table 1050 into language model 1060. In some embodiments, control circuitry 1002 determines that hash table 1050 is populated based on the passage of a threshold amount of time, which may be configured by a network administrator, or may be a default amount of time. In some embodiments, control circuitry 1002 determines that hash table 1050 is populated based on population of a threshold number of words (e.g., one million words). This can be words in the aggregate for all end points, or words in the aggregate for a single endpoint. Language model 1060 generates a behavior model for each endpoint based on the words populated for each endpoint. The behavior model is generated based on an algorithm derived upon "FastText", which is described in a publication entitled "Enriching Word Vectors with Subword Information", authored by P. Bojanowski, E. Grave, A. Joulin, and T. Mikolov, and published in 2016, the disclosure of which is hereby incorporated by reference in its entirety. FastText is itself based on the word2vec algorithm discussed above. Control circuitry 1002 commands the behavior models generated using language model 1060 to be stored at model store 1070, which acts in accordance with the manner in which storage circuitry 160 acts, as described above. Control circuitry 1002 may cause behavior models to be output to a user using API 1080, in any manner described above with respect to API 170.

Figure 11:
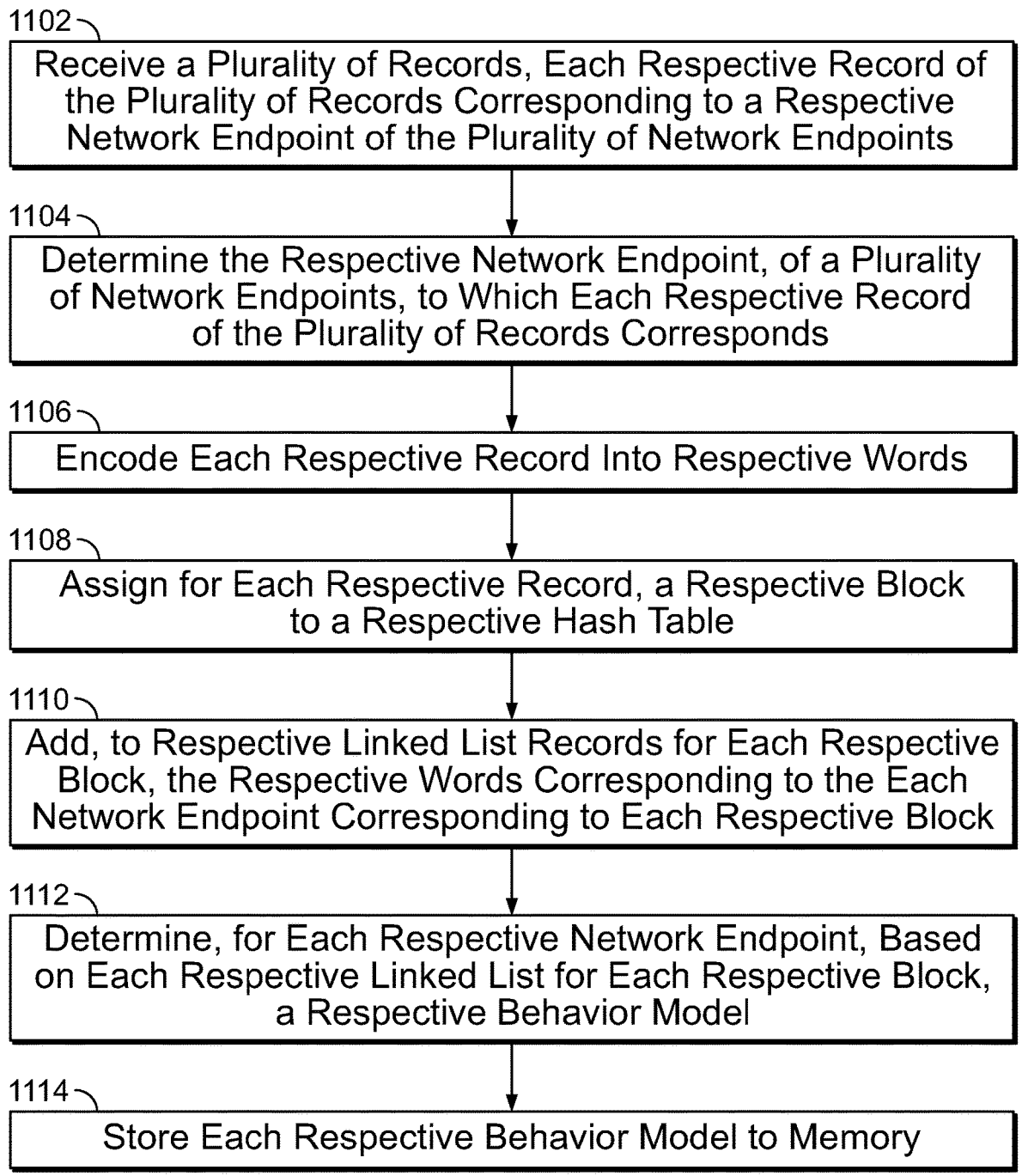
FIG. 11 depicts an illustrative flowchart of a process for reducing storage space used in tracking behavior of a plurality of network endpoints by modeling the behavior with a behavior model using a hash table, in accordance with some embodiments of the disclosure.

FIG. 11 depicts an illustrative flowchart of a process for reducing storage space used in tracking behavior of a plurality of network endpoints by modeling the behavior with a behavior model using a hash table, in accordance with some embodiments of the disclosure. Process 1100 begins at 1102, where control circuitry (e.g., control circuitry 1002) receives a plurality of records (e.g., from network endpoint 1012 of network 1014), each respective record of the plurality of records corresponding to a respective network endpoint of the plurality of network endpoints. Process 1000 continues to 1104, where control circuitry 1002 determines the respective network endpoint, of a plurality of network endpoints, to which each respective record of the plurality of records corresponds.

At 1106, control circuitry 1002 encodes each respective record into respective words. At 1108, control circuitry 1002 assigns for each respective record, a respective block to a respective hash table (e.g., hash table 1050). At 1110, control circuitry 1002 adds, to respective linked list records for each respective block (e.g., using linked list 1054), the respective words corresponding to the network endpoint corresponding to each respective block. At 1112, control circuitry 1002 determines, for each respective network endpoint, based on each respective linked list for each respective block, a respective behavior model (e.g., using language model 1060). At 1114, control circuitry 1002 stores each respective behavior model to memory (e.g., using model store 1070).

For brevity, elements of processes 300-900 and 1100 that were described in detail with respect to FIGS. 1 and 2 are not repeated in the description of FIGS. 3-9 and FIG. 11, but those above-described elements are intended to carry into their respective descriptions of FIGS. 3-9 and FIG. 11.

The foregoing describes systems, methods, and apparatuses for generating and storing zero-footprint behavior models of network endpoints (e.g., from network 110). The above-described embodiments of the present disclosure are presented for the purposes of illustration and not of limitation. Furthermore, the present disclosure is not limited to a particular implementation. For example, one or more steps of the methods described above may be performed in a different order (or concurrently) and still achieve desirable results. In addition, the disclosure may be implemented in hardware, such as on an application-specific integrated circuit (ASIC) or on a field-programmable gate array (FPGA). The disclosure may also be implemented in software by, for example, encoding transitory or non-transitory instructions for performing the process discussed above in one or more transitory or non-transitory computer-readable media.

As referred herein, the term "in response to" refers to initiated as a result of. For example, a first action being performed in response to a second action may include interstitial steps between the first action and the second action.

What is claimed is:

1. A method for reducing storage space used in tracking behavior of a network endpoint, the method comprising:
    determining a record corresponding to a single network flow originating from a network endpoint;
    extract a subset of fields from the record;
    encoding the subset of fields into a flow word corresponding to the single network flow originating from the network endpoint;
    assigning, for the record, a block to a hash table, wherein the block corresponds to the network endpoint;
    adding, to a linked list for the block, the flow word corresponding to the single network flow originating from the network endpoint;
    generating, for the network endpoint and based on the linked list for the block, an endpoint vector representing a behavior model for the network endpoint, wherein the generating comprises:
        concatenating, for the network endpoint, each flow word in the linked list for the block into a string; and
        feeding, for the network endpoint, the string into a Document to Vector (doc2vec) algorithm to output the endpoint vector representing the behavior model for the network endpoint;
    storing the behavior model in a memory;

determining an anomalous behavior state for the network endpoint by comparing the endpoint vector corresponding to the network endpoint to a normalcy threshold in a multidimensional space; and tracking behavior of the network endpoint over time by comparing a current position of the endpoint vector corresponding to the network endpoint in the multidimensional space to a previous position of a previous version of the endpoint vector corresponding to the network endpoint in the multidimensional space.

2. The method of claim 1, wherein the assigning comprises:

detecting that the record corresponds to an unknown network endpoint; and in response to the detecting, adding the block to the hash table.

3. The method of claim 1, wherein the generating the behavior model occurs, for the network endpoint, in response to detecting a threshold amount of flow words having been accumulated for the network endpoint.

4. The method of claim 1, wherein the generating the behavior model comprises:

identifying one or more modules of a plurality of modules that are idle; and commanding an idle module of the one or more identified idle modules to generate the endpoint vector representing the behavior model.

5. The method of claim 1, wherein the feeding the string into the doc2vec algorithm comprises analyzing, using the doc2vec algorithm, the string using a shallow neural network.

6. The method of claim 1, wherein the tracking is performed using a Kalman filter.

7. The method of claim 1, wherein the tracking further comprises:

tracking the behavior of the network endpoint by deriving a multivariate Gaussian distribution to determine the current position of the endpoint vector corresponding to the network endpoint in the multidimensional space.

8. A system for reducing storage space used in tracking behavior of a network endpoint, the system comprising:

storage circuitry;

communications circuitry; and control circuitry configured to:

determine a record corresponding to a single network flow originating from a network endpoint;

extract a subset of fields from the record;

encode the subset of fields into a flow word corresponding to the single network flow originating from the network endpoint;

assign, for the record, a block to a hash table, wherein the block corresponds to the network endpoint;

add, to a linked list for the block, the flow word corresponding to the single network flow originating from the network endpoint;

generate, for the network endpoint and based on the linked list for the block, an endpoint vector representing a behavior model for the network endpoint, wherein the generating comprises:

concatenating, for the network endpoint, each flow word in the linked list for the block into a string; and feeding, for the network endpoint, the string into a Document to Vector (doc2vec) algorithm to output the endpoint vector representing the behavior model for the network endpoint;

store, by the storage circuitry, the behavior model in a memory;

determine an anomalous behavior state for the network endpoint by comparing the endpoint vector corresponding to the network endpoint to a normalcy threshold in a multidimensional space; and track behavior of the network endpoint over time by comparing a current position of the endpoint vector corresponding to the network endpoint in the multidimensional space to a previous position of a previous version of the endpoint vector corresponding to the network endpoint in the multidimensional space.

9. The system of claim 8, wherein to assign, the control circuit is further configured to:

detect that the record corresponds to an unknown network endpoint; and in response to the detection, add the block to the hash table.

10. The system of claim 8, wherein generating the behavior model occurs, for the network endpoint, in response to detecting a threshold amount of flow words having been accumulated for the network endpoint.

11. The system of claim 8, wherein to generate the behavior model, the control circuit is further configured to:

identify one or more modules of a plurality of modules that are idle; and command an idle module of the one or more identified idle modules to generate the endpoint vector representing the behavior model.

12. The system of claim 8, wherein to feed the string into the doc2vec algorithm, the control circuit is further configured to analyze, using the doc2vec algorithm, the string using a shallow neural network.

13. The system of claim 8, wherein to track the behavior of the network endpoint, the control circuitry is further configured to track the behavior of the network endpoint over time using a Kalman filter.

14. The system of claim 8, wherein to track the behavior of the network endpoint, the control circuitry is further configured to:

track the behavior of the network endpoint by deriving a multivariate Gaussian distribution to determine the current position of the endpoint vector corresponding to the network endpoint in the multidimensional space.

15. A non-transitory computer-readable medium having instructions stored thereon that, when executed by a computing device, cause the computing device to perform operations comprising:

determining a record corresponding to a single network flow originating from a network endpoint;

extracting a subset of fields from the record;

encoding the subset of fields into a flow word corresponding to the single network flow originating from the network endpoint;

assigning, for the record, a block to a hash table, wherein the block corresponds to the network endpoint;

adding, to a linked list for the block, the flow word corresponding to the single network flow originating from the network endpoint;

generating, for the network endpoint and based on the linked list for the block, an endpoint vector representing a behavior model for the network endpoint, wherein the generating comprises:

concatenating, for the network endpoint, each flow word in the linked list for the block into a string; and feeding, for the network endpoint, the string into a Document to Vector (doc2vec) algorithm to output the endpoint vector representing the behavior model for the network endpoint;

storing the behavior model in a memory;

determining an anomalous behavior state for the network endpoint by comparing the endpoint vector corresponding to the network endpoint to a normalcy threshold in a multidimensional space; and tracking behavior of the network endpoint over time by comparing a current position of the endpoint vector corresponding to the network endpoint in the multidimensional space to a previous position of a previous version of the endpoint vector corresponding to the network endpoint in the multidimensional space.

16. The non-transitory computer-readable medium of claim 15, wherein the assigning further comprises:

detecting that the record corresponds to an unknown network endpoint; and in response to detecting, adding the block to the hash table.

17. The non-transitory computer-readable medium of claim 15, wherein the generating the behavior model occurs, for the network endpoint, in response to detecting a threshold amount of words having been accumulated for the network endpoint.

18. The non-transitory computer-readable medium of claim 15, wherein the generating the behavior model comprises:

identifying one or more modules of a plurality of modules that are idle; and commanding an idle module of the one or more identified idle modules to generate the endpoint vector representing the behavior model.

19. The non-transitory computer-readable medium of claim 15, wherein the feeding the string into the doc2vec algorithm comprises analyzing, using the doc2vec algorithm, the string using a shallow neural network.

20. The non-transitory computer-readable medium of claim 15, wherein the tracking is performed using a Kalman filter.

21. The non-transitory computer-readable medium of claim 15, wherein the tracking further comprises:

tracking the behavior of the network endpoint by deriving a multivariate Gaussian distribution to determine the current position of the endpoint vector corresponding to the network endpoint in the multidimensional space.

* * * * *

UNITED STATES PATENT AND TRADEMARK OFFICE
CERTIFICATE OF CORRECTION

Page 1 of 1

PATENT NO. : 11,996,986 B2
APPLICATION NO. : 17/940747
DATED : May 28, 2024
INVENTOR(S) : Bernardi et al.

It is certified that error appears in the above-identified patent and that said Letters Patent is hereby corrected as shown below:

In the Claims

In Column 10, Claim 1, Line 48, delete "extract" and insert -- extracting --, therefor.

Signed and Sealed this
Sixth Day of May, 2025

Coke Morgan Stewart
*Acting Director of the United States Patent and Trademark Office*